INVENTOR
Newton Diniz Quintella
BY
Pennie, Edmonds, Morton and Barrows
ATTORNEYS Patented May 13, 1952

2,596,941

UNITED STATES PATENT OFFICE 2,596,941

PROCESS OF MANUFACTURING ARTIFICIAL DENTURES AND SEMIMANUFACTURED DENTURES TO BE UTILIZED BY SAME PROCESS

Newton Diniz Quintella, Rio De Janeiro, Brazil

Application June 27, 1950, Serial No. 170,519
In Brazil February 6, 1950

3 Claims. (Cl. 32—2)

According to standard practice, artificial dentures have hitherto been made by fitting a row of porcelain or methyl-methacrylic resin teeth to the alveolar processes or gum borders by means of perfectly adapted plates.

The selection and arrangement of dentures for the individual patient require great care and professional skill in spite of such valuable aids as data tables, shape patterns and color scales supplied by the principal tooth manufacturers.

The making of dentures involves many working stages, two of them being particularly troublesome, namely, the finishing of the denture in wax and the polishing of the denture when made of methyl-methacrylic resin which is the material now commonly used.

About four years ago, methyl-methacrylic teeth were put on the market, superseding within a short time the former porcelain teeth completely and being now in general use. The main reason for their general acceptance is their resistance to breakage and easy adaptation to articulation.

One feature peculiar to teeth or dentures made of methyl-methacrylic resin turned out to be of great importance for dental prosthesis; it is the fact that the teeth and the baseplate constituting a denture permit a perfect welding as both are made of the same material, viz, methyl-methacrylic resin. This gave encouragement to take up again an old idea, that is, the development of a method permitting the use of partly made or semi-manufactured dentures the advantages of which will be shown hereunder.

The present invention contemplates the elaboration of a novel technique for using semi-manufactured dentures, thus doing away almost completely with the delays and risks occurring during the two above-mentioned stages of finishing in wax and final polishing.

It is known that additional resin can be added to a tooth or the gum part of a denture. This gave rise to the idea of creating a type of denture manufactured so as to permit increasing the length of its teeth and the volume of the gum part thereof. Thus, it is clear that a dentist, having at his disposal a thin denture properly dimensioned, for a particular patient may, in a single visit, perform three distinct stages which are the taking of the impression by the usual rebasement method, the trying out of the esthetic arrangement of the artificial teeth and the testing of functional articulation.

In the beginning, the additions were made on the full teeth commonly supplied by tooth manufacturers, but this still caused tedious prosthetic work in the laboratory. The problems involved become clear considering the manner how a tooth modelled in wax is transformed into its definite form of methyl-methacrylic material. Once the completely retouched model in wax is ready, it is imbedded in the plaster contained in the muffle made up of two halves which open and close. On one side, the teeth with their cusps remain firmly imbedded in the plaster and on the other projecting side, is the patient's gingival ridge. Now, inasmuch as the teeth are imbedded with their cusps in the plaster, it is impossible to make additions thereto if this normal technique is applied.

As the time required for the work could not be shortened by using ordinary methyl-methacrylic resin teeth, it was next thought that the use of teeth in wax for the trials would achieve the desired result of shortening the working time.

In point of fact, this procedure did offer some advantage, but not to such an extent as would be desirable and as now is actually obtained by the improved method according to the present invention, which will be described as follows.

The invention consists in using a semi-manufactured denture to be applied by means of a novel method of rebasement specially created for the use of such denture and permitting the readjustment in a single operation, of both the gum part and the occlusal plane of the teeth.

The invention is illustrated, by way of example, in the accompanying drawings in which.

As indicated by reference numbers 1 of Figs.

Figure 1:
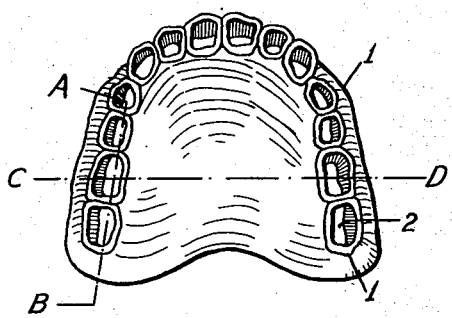
Fig. 1 represents the artificial denture, according to the invention, for the maxillary or upper jaw, looking at its inferior face.
Figure 2:
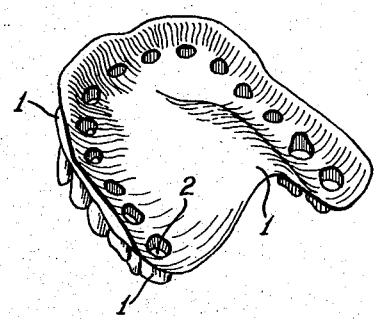
Fig. 2 shows the superior face of the artificial denture of Fig. 1.
Figure 3:
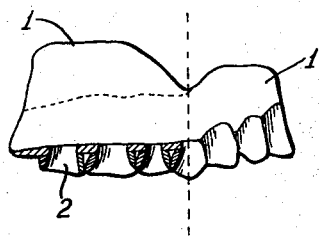
Fig. 3 is a sectional view taken on line A—B of Fig. 1.
Figure 4:
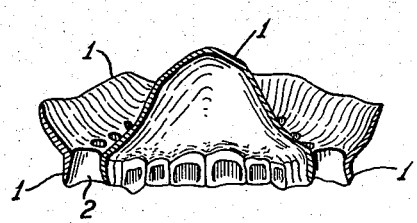
Fig. 4 is a sectional view taken along the line C—D of Fig. 1.
Figure 5:
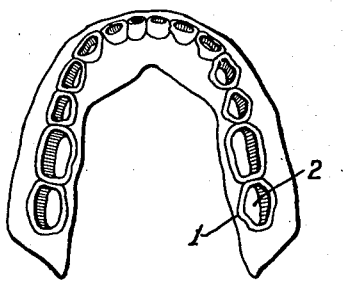
Fig. 5 represents the denture for the lower jaw, looking at its occlusal face.
Figure 6:
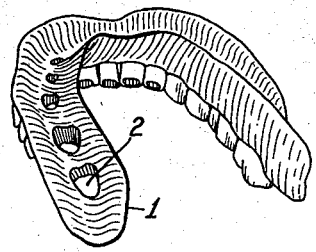
Fig. 6 illustrates the denture for the lower jaw in a perspective view, with its interior face visible.
Figure 7:
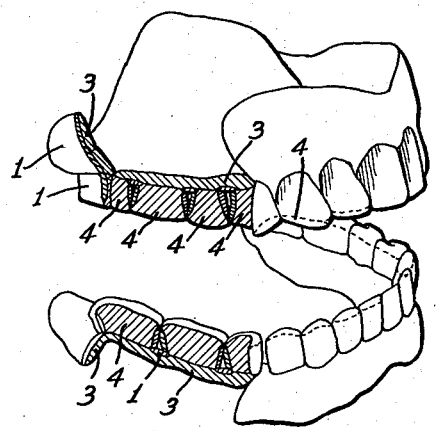
Fig. 7 is a perspective view of the dentures for the upper and lower jaws respectively, with parts cut away for purposes of illustration, and showing the two dentures with the added material.
Figure 8:
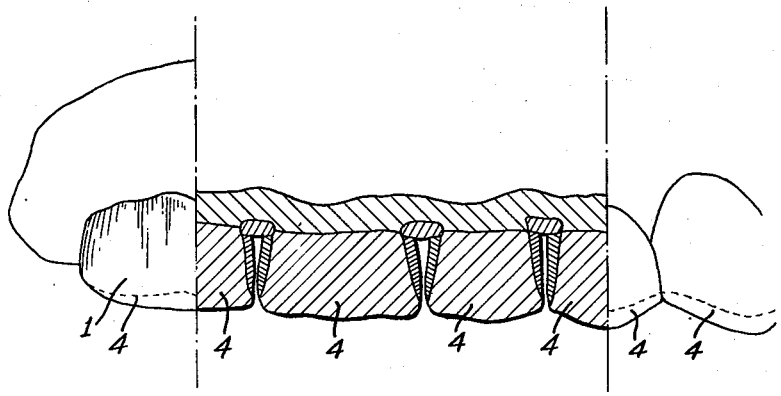
Fig. 8 is a section in part through the denture for the upper jaw of Fig. 7 for illustration of the added material.

1, 2, 3 and 4 in the drawings, the denture is extremely thin in order to permit applying thereto the addition of rebasing material as a superposed layer, as indicated by 3 in Fig. 7.

The main feature of the invention is that all the teeth of the denture, upper and lower ones, are perforated longitudinally, to provide spaces in the teeth extending longitudinally thereof from their outer sides, as indicated by 2 in Figs. 1 through 6 of the drawings. Such perforations are made so that only the occlusal faces of the teeth are missing, whereas the configuration of the remaining faces is preserved, but the plate where the teeth are inserted may also be perforated.

The semi-manufactured denture as above described is readjusted and completed by using the following method.

The dentist having before him a totally or partially edentulous patient will first choose a suitable type of semi-manufactured denture matching the size and shape of the patient's face. Thereafter, the denture is fitted to the patient by cutting away at its borders and teeth to permit all muscular and articular movements. Once this has been accomplished, a static articulation is taken by having the patient bite on the teeth which have previously been filled up with wax. After articulation of the teeth the gum part is rebased with a material suitable for this purpose. Readjustment of the base thus being effected, the denture will already have sufficient retentiveness and stability for effecting masticatory movements. After that, the cusps of the teeth are touched up and then, the work is taken to the laboratory.

The denture thus moulded is placed in a muffle already filled with plaster for making a copy of the modelled parts, that is, the gum ridge and the occlusal plane, and, later on, the muffle is opened, containing in one of its halves the model of the patient's mouth and in the other half the semi-manufactured denture imbedded in the plaster which receives the impressions of the cusps of the teeth made in wax. Subsequently, all the material utilized in the (gingival and dental) rebasement is removed which leaves the clean semi-manufactured denture attached to the plaster. This done, the teeth are filled with material 4 of the color of the teeth and the gum part with material 3 of its own color and after being pressed, polymerized and finally removed from the muffle, the denture is ready for the finishing operation which only consists in removing burrs and polishing up.

As seen from the above description, the present invention represents a great improvement in artificial dentures which results in a saving of working time when compared with previously known methods, and permits reducing considerably the cost of such dentures.

In point of fact, the present invention makes it possible to produce in series and at low cost semi-manufactured dentures which are easily adapted and finished to the same degree of perfection of work hitherto attained by the old methods.

I claim:

1. A partially-formed denture having a base portion of material suitable for the base portion of a completed denture, and a plurality of teeth fixed in said base portion, said teeth being devoid of their incisal and occlusal surfaces and having inner walls defining spaces extending longitudinally of the teeth inwardly from their outer ends.

2. The method of making an artificial denture from a partially-formed denture having a base portion of material suitable for the base portion of a completed denture and teeth fixed in said base portion which are devoid of their incisal and occlusal surfaces and have inner walls defining spaces extending longitudinally of the teeth inwardly from their outer ends, which includes the steps of filling the spaces in the teeth with plastic material, shaping the outer surfaces of the plastic fillings to the proper incisal and occlusal surfaces, and replacing the plastic fillings with material suitable for completed artificial teeth, said operations being performed while retaining said base portion intact.

3. The method of claim 2 which includes the steps of applying a coating of plastic material to the surface of said base portion opposite the surface from which the teeth extend, and conforming the outer surface of the coating to the configuration of a patient's mouth.

NEWTON DINIZ QUINTELLA.

REFERENCES CITED

The following references are of record in the file of this patent:

UNITED STATES PATENTS

| Number | Name | Date |
| --- | --- | --- |
| 590,799 | White | Sept. 28, 1897 |
| 1,754,058 | Smith | Apr. 8, 1930 |
| 2,525,962 | Silverman | Oct. 17, 1950 |